United States Patent
Campbell et al.

(10) Patent No.: US 10,229,292 B2
(45) Date of Patent: *Mar. 12, 2019

(54) TAMPER RESISTANT ELECTRONIC DEVICES

(71) Applicant: International Business Machines Corporation, Armonk, NY (US)

(72) Inventors: Eric J. Campbell, Rochester, MN (US); Sarah K. Czaplewski, Rochester, MN (US); Joseph Kuczynski, North Port, FL (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/816,093

(22) Filed: Nov. 17, 2017

(65) Prior Publication Data

US 2018/0114418 A1    Apr. 26, 2018

Related U.S. Application Data

(63) Continuation of application No. 15/299,257, filed on Oct. 20, 2016, now Pat. No. 9,858,780.

(51) Int. Cl.
*G06F 21/86* (2013.01)
*G08B 29/04* (2006.01)

(52) U.S. Cl.
CPC ............. *G06F 21/86* (2013.01); *G08B 29/046* (2013.01)

(58) Field of Classification Search
CPC .... G08B 13/18; G08B 13/181; G08B 13/186; G08B 13/1472

USPC ............. 340/568.1, 571, 589; 235/487, 492; 428/323, 327; 73/762; 116/216

See application file for complete search history.

(56) References Cited

U.S. PATENT DOCUMENTS

| | | |
|---|---|---|
| 3,481,790 A | 12/1969 | Duddy |
| 4,811,288 A | 3/1989 | Kleijne et al. |
| 5,325,721 A | 7/1994 | Pendergrass, Jr. |
| 5,406,630 A | 4/1995 | Piosenka et al. |

(Continued)

FOREIGN PATENT DOCUMENTS

WO    2013041871 A2    3/2013

OTHER PUBLICATIONS

List of IBM Patents or Application Treated as Related.

(Continued)

*Primary Examiner* — Hung T Nguyen
(74) *Attorney, Agent, or Firm* — Patterson + Sheridan, LLP

(57) ABSTRACT

A tamper resistant device comprises a matrix material and a microcapsule in the matrix material. The microcapsule has a first compartment, a second compartment, and an isolating structure separating the first and second compartments. The isolating structure is rupturable in response to a stimulus, such as temperature increases or compressive forces. The first compartment contains a first component, and the second compartment contains a second component. The first and second components react exothermically (produce heat) when in contact with each other. Thus, in some examples, a temperature change in the device resulting from the rupture of the isolating structure in the microcapsule due to physical tampering efforts can be used to trigger a security response.

20 Claims, 4 Drawing Sheets

(56) References Cited

U.S. PATENT DOCUMENTS

| | | | |
|---|---|---|---|
| 6,066,378 A * | 5/2000 | Morii | G03H 1/02 |
| | | | 283/108 |
| 6,217,213 B1 | 4/2001 | Curry et al. | |
| 7,223,964 B2 | 5/2007 | Wiese et al. | |
| 7,247,791 B2 | 7/2007 | Kulpa | |
| 7,362,248 B2 | 4/2008 | McClure et al. | |
| 7,385,491 B2 | 6/2008 | Doi | |
| 7,443,176 B2 | 10/2008 | McClure et al. | |
| 7,573,301 B2 | 8/2009 | Walmsley | |
| 7,930,021 B2 | 4/2011 | Ashida et al. | |
| 8,502,396 B2 | 8/2013 | Buer et al. | |
| 8,522,049 B1 | 8/2013 | Ahmadi | |
| 8,623,418 B2 | 1/2014 | Liang et al. | |
| 8,865,285 B2 | 10/2014 | Dagher et al. | |
| 9,245,202 B2 | 1/2016 | Boday et al. | |
| 2005/0031688 A1 | 2/2005 | Ayala | |
| 2007/0207284 A1 | 9/2007 | McClintic | |
| 2009/0145347 A1* | 6/2009 | Nakamura | G01K 11/125 |
| | | | 116/216 |
| 2009/0155571 A1 | 6/2009 | Mustonen | |
| 2010/0006431 A1 | 1/2010 | Wallace et al. | |
| 2015/0169015 A1 | 6/2015 | Yebka et al. | |

OTHER PUBLICATIONS

U.S. Appl. No. 15/299,257 entitled "Tamper Resistant Electronic Devices," filed Oct. 20, 2016.
U.S. Appl. No. 15/299,270 entitled "Tamper Resistant Electronic Devices," filed Oct. 20, 2016.

* cited by examiner

US 10,229,292 B2

TAMPER RESISTANT ELECTRONIC DEVICES

CROSS-REFERENCE TO RELATED APPLICATIONS

This application is a continuation of U.S. patent application Ser. No. 15/299,257, filed Oct. 20, 2016, now U.S. Pat. No. 9,858,780. The aforementioned related patent application is herein incorporated by reference in its entirety.

BACKGROUND

The present disclosure concerns physical security of electronic components in computing systems.

Computing systems include electronic components such as security devices and cryptographic modules to prevent data theft and the like. These devices and modules provide data security in personal computing systems and high-end network servers. These devices and modules are, for example, implemented as a device card or on a printed circuit board. To meet industry accepted standards for protection, these devices and modules must incorporate features and mechanisms that provide physical security for internal device components such that physical attempts to access or tap internal components can be detected and/or responded to in a manner that resists tampering and/or unauthorized access of data.

SUMMARY

According to one embodiment, a tamper resistant apparatus comprises an internal component, a matrix material surrounding the internal component, and a microcapsule in the matrix material. The microcapsule has a first compartment, a second compartment, and an isolating structure separating the first and second compartments. The isolating structure is rupturable in response to a stimulus. The first compartment contains a first component. The second compartment contains a second component that reacts with the first component to produce heat.

According to another embodiment, a secured device comprises an electronic component and a casing surrounding the electronic component. The casing includes a security layer comprised of a matrix material and a microcapsule in the matrix material. The microcapsule has a first compartment, a second compartment, and an isolating structure separating the first and second compartments. The isolating structure is adapted to rupture in response to a stimulus. The first compartment contains a first component, and the second compartment contains a second component that reacts with the first component to produce heat.

According to still another embodiment, a secured device comprises an electronic component and a casing surrounding the electronic component. The casing includes a security layer having a first reactive component in a first portion, a second reactive component in a second portion, and fracturable layer separating the first portion from the second portion. The fracturable layer is adapted to fracture in response to a stimulus. The first reactive component reacts with the second reactive component to produce heat.

DETAILED DESCRIPTION

Secured devices, such as encryption modules, that are resistant to physical tampering are used in various computing systems to protect sensitive data and components. For example, stored data that might be effectively invulnerable to unauthorized access via software protocols might be relatively easily accessed by direct, physical means, even if the stored data is notionally protected by encryption. Such physical access might entail drilling through, or physical removal of, portions of an outer casing or packaging of an electronic component. Physical access to internal device components might allow various data protective features of the device to be overridden or avoided such that otherwise protected data could be accessed. For example, by making direct electrical connections to various internal components, an encryption module might be effectively disabled or overridden. Alternatively, physical access to internal device components might allow incoming and outgoing data to be monitored or redirected in an unauthorized manner. Furthermore, in some instances, even physical access to internal components merely for purposes of studying a device might be harmful from the standpoint of security in similar installed devices.

Figure 1:
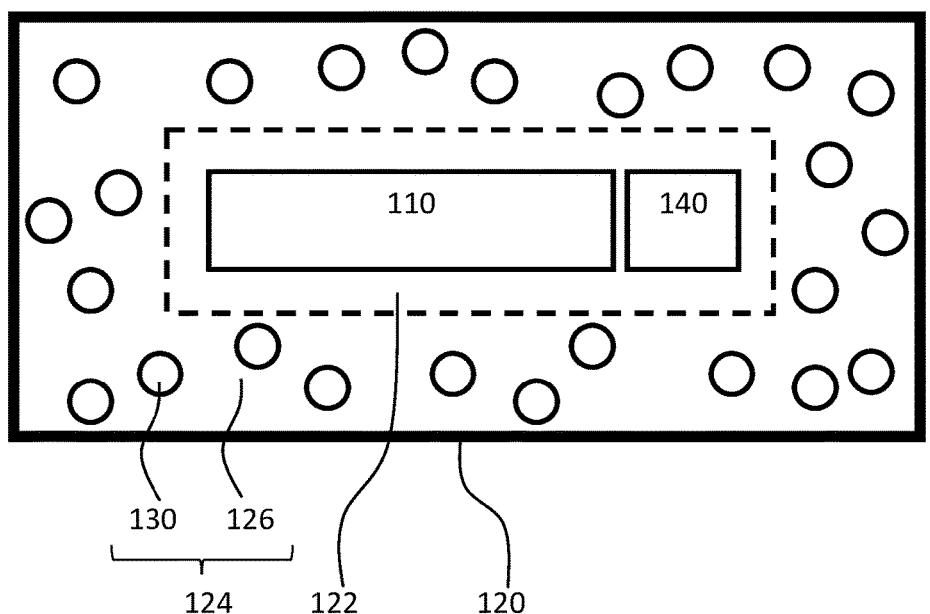
FIG. 1 depicts a secured device according to an embodiment.

FIG. 1 depicts a secured device 100 including an internal component 110 and a casing 120 surrounding the internal component 110. The secured device 100 may be, without limitation, a circuit board, a packaged integrated circuit, a microchip, a microprocessor, an electronic card device, a cartridge device, a cryptographic module, or combinations of these elements. The internal component 110 may be, without limitation, a circuit board, an integrated circuit, a packaged integrated circuit, a microchip, a microprocessor, an electronic card device, a cartridge device, a cryptographic module, or combinations of these elements. Additionally, while a single internal component 110 is depicted in the secured device 100 of FIG. 1, a plurality of internal components 110 may be provided within casing 120. Internal component 110 may also include a power source such as a battery.

Casing 120 is depicted in FIG. 1 as completely encasing or surrounding internal component 110 and while this might be a preferred arrangement from the standpoint of physical security, various portions of the internal component 110 might be left uncovered as needed for mounting or connecting the secured device 100 within a computing system. For example, various terminals, leads, contacts, or wires might be left exposed by, or allowed to protrude from, casing 120.

As depicted in FIG. 1, casing 120 includes a thermally conductive layer 122 on which a security layer 124 is disposed. The security layer 124 includes a matrix material 126 and microcapsules 130. In this context a "security layer" is a layer or region of a casing component included for purposes of allowing the detection and/or prevention of physical tampering efforts on a device incorporating the casing component. In this example, the matrix material 126 is a polymeric resin, but the matrix material is not limited to polymeric resins. In a particular example, matrix material 126 may be a crosslinked epoxy resin but other polymers may be suitable. Because physical security is being addressed, physically tough, chemically resistant, and generally insoluble polymers may be suitable materials for matrix material 126 in some instances. In some examples, the matrix material 126 might be any material within which microcapsules 130 can be dispersed, such as a polymer resin, a glass, or a ceramic.

Some materials used in forming matrix material 126 may be applied as a liquid, and then subsequently cured to a solid state by thermal, photo, or other processing. Microcapsules 130 may be incorporated into the liquid precursor of the cured matrix material 126. The matrix material 126 may further include various fillers and/or colorants 128, though these are not necessarily required.

Security layer 124 may include one or more layers of matrix material 126. Other types of layers may be included in or on security layer 124 for various purposes, such as structural stability, chemical resistance, or tampering prevention or the like. Such additional layers may be laminated (or otherwise mounted) on security layer 124 or physically spaced from security layer 124 within casing 120. For example, metal layers, radiation blocking layers, or the like might be included in or with security layer 124. Similarly, metal meshes may be embedded in or laminated on matrix material 126 for various purposes. And as discussed further below in conjunction with FIG. 5, casing 120 may incorporate other components such as reactive layers, ignition layers, and the like.

In the secured device 100 depicted in FIG. 1, a thermally conductive layer 122 is included in casing 120. The thermally conductive layer 122 could be, for example, a metal film, foil, or mesh. The material for thermally conductive layer 122 could be, for example, copper or aluminum, but is not limited to metals. For example, thermally conductive layer 122 may comprise some portion of resin material 120. In other examples, other carbon containing thermally conductive materials, such as thermally conductive polymers, carbon containing composites, graphite, and/or graphene, may be used as, or in, the thermally conductive layer. In some embodiments, a distinct thermally conductive layer 122 may be omitted and heat transfer, for various purposes discussed further below, may occur through the security layer 124. However, higher thermal conductivity and lower heat capacity materials and structures may be advantageous in some instances so that that tampering events might be more easily detected via temperature changes in the thermal conductive layer 122.

Thermally conductive layer 122 is connected to a heat sensor 140. Heat sensor 140 is used to monitor the temperature of casing 120. Heat sensor 140 may be, for example, a thermocouple, thermistor, a silicon bandgap temperature sensor or the like. While only one heat sensor 140 is depicted in FIG. 1, a plurality of heat sensors 140 may be incorporated into secured device 100.

Heat sensor 140 is used to detect a temperature rise (or change) associated with a tampering event and to trigger a security response, such as shutdown of internal component 110. In this context, "security response" includes any actions to prevent or limit access to a component within casing 120, and without limitation, may include: shutdown of an internal component or a portion thereof, transmitting an alarm signal to an internal component, transmitting an alarm signal to an external component, sounding an audible alarm, triggering a visual alarm, rendering an internal component inoperable, physical destruction of an internal component or a portion thereof, erasure of electronically stored data, encrypting internal data, overwriting stored data with dummy data, or the like.

When thermally conductive layer 122 is part of security layer 124, the heat sensor 140 may be in direct contact with the security layer 124. In some embodiments, heat sensor 140 may comprise a plurality of sensor probes for monitoring temperature at several points within the secured device 100.

Microcapsules 130 are incorporated into matrix material 126. FIG. 1 depicts the distribution of microcapsules 130 within matrix material 126 in a simplified manner for purposes of explanation. In general, the distribution of microcapsules 130 may be statistically homogenous, but it is not required that microcapsule 130 distribution be uniform for any given unit volume of casing 120. Furthermore, the distribution of microcapsules 130 within matrix material 126 may be inhomogeneous, either purposively or inadvertently. For example, a concentration of microcapsules 130 in matrix material 126 may be purposively increased during fabrication by direct injection of microcapsules 130 into matrix material 126 (or a precursor to matrix material 126) at sites considered particularly vulnerable to physical tampering events.

The depiction of relative sizes of each microcapsule 130 in casing 120 is not intended to be to scale with respect to thickness of matrix material 126 (or any other dimension). As an example, microcapsules 130 may have about a 10 μm outer diameter and the security layer 124 may have a thickness of about 1000 μm or more. FIG. 1 depicts each microcapsule 130 as a spheroid having a same diameter. However, uniform shape and size of microcapsules 130 is not a requirement and microcapsules 130 having different shapes and dimensions may be included in security layer 124.

Microcapsules 130 may be referred to as multi-compartment microcapsules. Each microcapsule 130 includes at least two components (first component 132 and second component 134) separated by a rupturable barrier (see FIGS. 2A and 2B). The barrier can be designed to rupture in response to a stimulus. For example, the barrier may be designed to rupture under a particular force, such a compressive force that might be associated with tampering events, such as drilling or physical probing of the casing 120. In some embodiments, the stimulus may be a temperature increase associated with tampering events and/or the rupturing in neighboring microcapsules 130.

The first component 132 and second component 134 undergo an exothermic reaction when mixed or otherwise placed in direct contact with each other. That is, in an initial state, the first component 132 and second component 134 are separated from each other by a barrier within the microcapsule 130. This barrier is designed to rupture in response to tampering events so as to allow the first component 132 and the second component 134 to contact each other and react to generate heat which causes the temperature in the casing 120 to increase (at least in some area local to the tampering site). That is, when casing 120 is physically probed, drilled, or otherwise subjected to physical force, the barriers in some portion of the microcapsules 130 of security layer 124 rupture in response. The rupturing of the barrier allows the first component 132 and the second component 134 in those microcapsules to react. This reaction generates heat that increases the temperature of casing 120 (or some portion thereof). A heat sensor 140 detects the associated temperature increase in the casing 120 (or some portion thereof). The heat sensor 140 can then trigger a security response such as, without limitation, transmitting an alarm to an internal component 110, shutting down internal component 110, and/or erasing data stored by internal component 110. The security response might even entail initiating physical destruction of internal component 110 or portions of internal component 110.

In general, the first component 132 and the second component 134 can be any two materials which react exothermically with each other. In a particular example, the first component 132 comprises iron (Fe) and the second component 134 comprises hydrogen peroxide ($H_2O_2$). Other embodiments may incorporate different or additional reactive components in distinct compartments within the microcapsule 130 or inside compartments with first component 132 or second component 134. For example, the first component 132 may be an iron powder mixed with ferric nitrate ($Fe(NO_3)_3$) and the second component 134 may be hydrogen peroxide. Alternatively, the first component 132 may be hydrogen peroxide and the second component 134 may be iron powder mixed with ferric nitrate.

The relative volumes/amounts of the components in microcapsule 130 may be set such that each microcapsule 130 includes a stoichiometric amount of reactants, or an excess of any reactant may be provided. Various catalytic materials may be incorporated into microcapsule 130 along with the first component 132 and the second component 134. And as discussed, microcapsules 130 are not limited to only two compartments and two reactive components.

Example Microcapsules

Figure 2A:
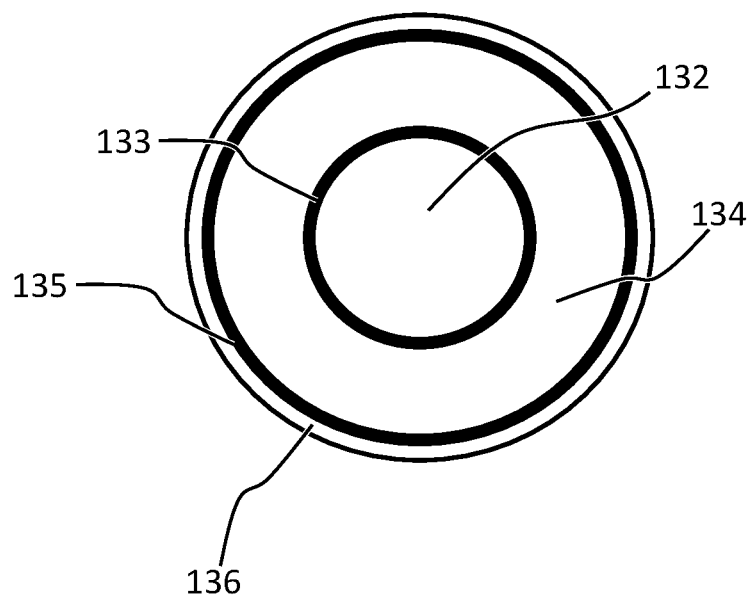
FIGS. 2A and 2B depict various microcapsules which can be incorporated into a secured device according to the first embodiment.

FIG. 2A depicts a particular example of an internal structure of a microcapsule 130. The depicted microcapsule 130 may be referred to as a multi-compartment microcapsule having a shell-in-shell architecture. In the microcapsule 130 of FIG. 2A, compartments for first component 132 and second component 134 are provided by an inner shell 133 contained within an outer shell 135. The depiction in FIG. 2A is cross-sectional and the microcapsule 130 may be a spheroid or ovoid. The inner shell 133 may be designed to rupture under a particular compressive force. The outer shell 135 may be designed to rupture under the same force as the inner shell 133 or a different force. A coating 136 can be provided on the outer shell 135. The coating 136 is optional and can be included, for example, to promote adhesion and/or miscibility between microcapsule 130 and the matrix material 126. Additional compartments/shells may be provided, such that, for example, a plurality of inner shells 133 may be provided in a nested arrangement with additional components included within the additional compartments thus formed.

Figure 2B:
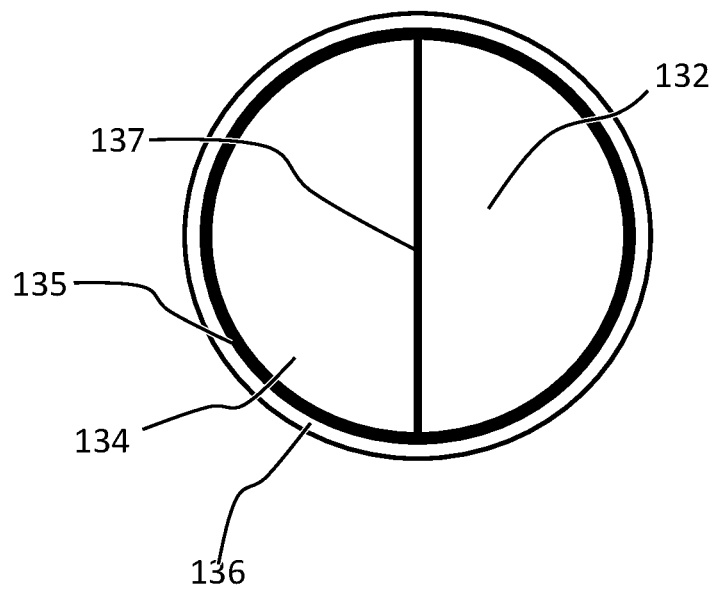

FIG. 2B depicts another particular example of an internal structure of a microcapsule 130. The depicted microcapsule 130 may be referred to as a multi-compartment microcapsule. In the microcapsule 130 of FIG. 2B the compartments for first component 132 and second component 134 are formed by an inner membrane 137 contained within outer shell 135. The depiction in FIG. 2B is cross-sectional and the microcapsule 130 may be spheroid or ovoid. The inner membrane 137 may be designed to rupture under a particular compressive force. The outer shell 135 may be designed to rupture under the same force as the inner membrane 137 or a different force. As depicted in FIG. 2A, a coating 136 can be provided on the outer shell 135.

Additional compartments/shells may be provided in some embodiments, such that, for example, a plurality of inner shells 133 may be provided in a nested arrangement around the third component 138 with additional components included within the additional nested compartments thus formed.

There is no requirement that only one type of microcapsule 130 be incorporated in a secured device 100. For example, any combination of different types of microcapsules 130 described above may be incorporated into a secured device 100. Microcapsule types may be mixed together within matrix material 126 or security layer 124 may comprise distinct layers of matrix material 126 laminated or stacked on each other, with each layer including a different type of microcapsule 130.

Physical Security Process

In a particular embodiment, a method comprises: obtaining a secured device having an electronic component and a casing. The casing surrounding the electronic component and including a security layer. The security layer including a matrix material and a microcapsule in the matrix material. The microcapsule has a first compartment, a second compartment, and an isolating structure separating the first and second compartments. The isolating structure is adapted to rupture in response to a stimulus. The first compartment contains a first component, and the second compartment contains a second component that reacts with the first component to produce heat. The method further comprises monitoring a temperature of the casing and triggering a security response when the temperature of casing changes.

Figure 3:
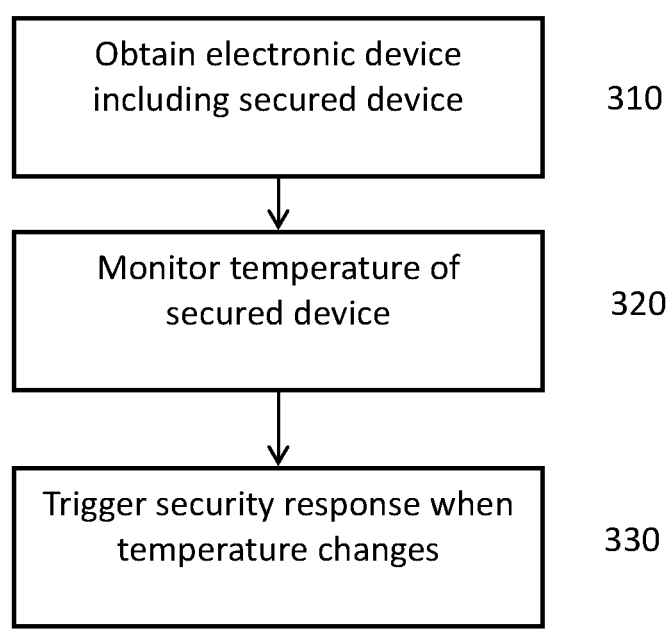
FIG. 3 depicts aspects of a method of providing physical security for an electronic component.

FIG. 3 depicts aspects of a method of providing physical security and tampering resistance for an electronic component. In security method 300, an electronic component encompassing a secured device, such as secured device 100, is obtained (aspect 310). Obtaining an electronic component according to aspect 310 may include fabricating/manufacturing the electronic component to include the secured device or purchasing or otherwise acquiring access to the electronic component already including the secured device. The electronic component may itself be the secured device, or the electronic component may be a larger apparatus in which secured device is merely a sub-component.

In aspect 320, the temperature of the secured device is monitored during operation of the electronic component by a heat sensor of the secured device. The heat sensor is used to detect unusual temperature variations in the secured device. In this context, unusual temperature variations might include not only temperature increases associated with physical tampering events such as probing or drilling of a casing of the secured device, but also temperature decreases associated with attempts to mask or obfuscate temperature changes associated with physical tampering events. For example, a dramatic cooling of the secured device resulting from exposure of the secured device to a cooling liquid (e.g., liquid nitrogen) could be detected and used to trigger a security response. Furthermore, in this context, detection of unusual temperature variations might include determination of temperature ranges associated with normal operations of the electronic component. For example, determination of unusual temperature changes might account for present and/or recent operating states (e.g., idle, sleep, startup, on/off) of the electronic component, such that temperature changes associated with normal power cycles might be ignored.

In aspect 330, the secured device triggers a security response when an unusual temperature variation is detected. In this context, a security response is as described above and may include, without limitation, activating an alarm, transmitting a message, powering down one or more electronic components, erasing stored data, overwriting stored data with dummy data, triggering destruction of one or more electronic components.

Fabrication of Microcapsules

Microcapsules 130 may be prepared according to methods disclosed in U.S. patent Ser. No. 14/937,983, the entire contents of which is incorporated herein by reference. In one possible method, microcapsules 130 can be prepared by preparing spherical calcium carbonate microparticles in which finely powdered iron (Fe) and magnetite ($Fe_3O_4$) are immobilized by co-precipitation. Optionally a catalyst such as ferric nitrate may be included in the calcium carbonate microparticles. For example, 1M $CaCl_2$ (0.615 mL), 1M $Na_2CO_3$ (0.615 mL), 1.4% (w/v) magnetite nanoparticle suspension (50 μL) and deionized water (2.450 mL) containing finely powdered iron (2 mg) and, optionally, $Fe(NO_3)_3$ (0.01 mg) may be mixed and thoroughly agitated on a magnetic stirrer for 20 s at room temperature. After the agitation, the precipitate may be separated from the supernatant by centrifugation and washed three times with water. The diameter of the $CaCO_3$ microparticles produced by a reaction time of 20 s is 4-6 μm. Smaller $CaCO_3$ microparticles are produced if the reaction time is reduced. Other metals may be used in lieu of, or in addition to, the powdered iron. For example, magnesium or magnesium-iron alloy may also be used.

Other magnetic nanoparticles may be used in lieu of, or in addition to, the magnetite. For example, cobalt ferrite nanoparticles may also be used. As noted above, the iron powder may be mixed with a catalyst such as ferric nitrate, which when in contact with hydrogen peroxide (to be encapsulated in the outer shell in this example) liberates oxygen, which reacts exothermically with the iron powder. Other catalysts may be used in lieu of, or in addition to, the ferric nitrate. For example, sodium iodide (NaI) may also be used.

In this example, the fabrication of microcapsules is based on the layer-by-layer (LbL) self-assembly of polyelectrolyte thin films. Such polyelectrolyte capsules are fabricated by the consecutive adsorption of alternating layers of positively and negatively charged polyelectrolytes onto sacrificial colloidal templates. Calcium carbonate is but one example of a sacrificial colloidal template. One skilled in the art will appreciate that other templates may be used in lieu of, or in addition to, calcium carbonate. For example, polyelectrolyte capsules may be templated on melamine formaldehyde and silica. In the present example, the $CaCO_3$ microparticles are LbL coated to form a polyelectrolyte multilayer (PEM) build-up by adsorbing five bilayers of negative PSS (poly (sodium 4-styrenesulfonate); Mw=70 kDa) and positive PAH (poly(allylamine hydrochloride); Mw=70 kDa) (2 mg/mL in 0.5 M NaCl) by using the layer-by-layer assembly protocol. The $CaCO_3$ microparticles may be dispersed in a 0.5 M NaCl solution with 2 mg/mL PSS (i.e., polyanion) and shaken continuously for 10 min. The excess polyanion may be removed by centrifugation and washing with deionized water. Then, 1 mL of 0.5 M NaCl solution containing 2 mg/mL PAH (i.e., polycation) may be added and shaken continuously for 10 min. The excess polycation may be removed by centrifugation and washing with deionized water. This deposition process of oppositely charged polyelectrolytes may be repeated five times and, consequently, five PSS/PAH bilayers are deposited on the surface of the $CaCO_3$ microparticles. The thickness of this "inner shell" polyelectrolyte multilayer may be varied by changing the number of bilayers. Other polyelectrolyte multilayers and other coatings may be used in lieu of, or in addition to, the PSS/PAH-multilayer. For example, coating polyelectrolyte multilayer capsules with lipids can result in a significant reduction of the capsule wall permeability.

To prepare ball-in-ball calcium carbonate microparticles in which a second material such as hydrogen peroxide is immobilized in a second compartment, a polyelectrolyte multilayer that is sandwiched between two calcium carbonate compartments is formed by another co-precipitation process. To this end, the polymer-coated $CaCO_3$ microparticles may be re-suspended in 1M $CaCl_2$ (0.615 mL), 1M $Na_2CO_3$ (0.615 mL), and deionized water (2.500 mL) containing hydrogen peroxide (1 mg), rapidly mixed and thoroughly agitated on a magnetic stirrer for 20 s at room temperature. After the agitation, the precipitate may be separated from the supernatant by centrifugation and washed three times with water. The second co-precipitation may be accompanied by formation of a coproduct, i.e., single core $CaCO_3$ microparticles that contain only hydrogen peroxide. Hence, the resulting precipitate represents a mixture of ball-in-ball $CaCO_3$ microparticles and single core $CaCO_3$ microparticles. The ball-in-ball $CaCO_3$ microparticles are, however, magnetic due to the immobilized magnetite nanoparticles in the inner compartment, and thus may be isolated by applying an external magnetic field to the sample while nonmagnetic single core $CaCO_3$ microparticles are removed by a few washing steps.

Another LbL coating is formed on the ball-in-ball $CaCO_3$ microparticles by a polyelectrolyte multilayer (PEM) build-up with five bilayers of negative PSS (poly(sodium 4-styrenesulfonate); Mw=70 kDa) and positive PAH (poly(allylamine hydrochloride); Mw=70 kDa) (2 mg/mL in 0.5 M NaCl) by using the layer-by-layer assembly protocol. For example, the ball-in-ball $CaCO_3$ microparticles may be dispersed in a 0.5 M NaCl solution with 2 mg/mL PSS (i.e., polyanion) and shaken continuously for 10 min. The excess polyanion may be removed by centrifugation and washing with deionized water. Then, 1 mL of 0.5 M NaCl solution containing 2 mg/mL PAH (i.e., polycation) may be added and shaken continuously for 10 min. The excess polycation may be removed by centrifugation and washing with deionized water. This deposition process of oppositely charged polyelectrolyte may be repeated five times and, consequently, five PSS/PAH bilayers are deposited on the surface of the ball-in-ball $CaCO_3$ microparticles.

The $CaCO_3$ core of the ball-in-ball $CaCO_3$ microparticles may be removed by complexation with ethylenediaminetetraacetic acid (EDTA) (0.2 M, pH 7.5) leading to formation of shell-in-shell microcapsules. For example, the ball-in-ball $CaCO_3$ microparticles may be dispersed in 10 mL of the EDTA solution (0.2 M, pH 7.5) and shaken for 4 h, followed by centrifugation and re-dispersion in fresh EDTA solution. This core-removing process may be repeated several times if necessary to completely remove the $CaCO_3$ core. The diameter of the resulting shell-in-shell microcapsules ranges from 8-10 μm with an inner core diameter of 3-5 μm.

A multi-compartment microcapsule for heat generation in accordance with some embodiments of the present disclosure may be produced by other conventional multi-compartment capsule fabrication processes, such use of polymeric micelles, hybrid polymer microspheres, and two-compartment vesicles.

Reactive Security Layers

Figure 4:
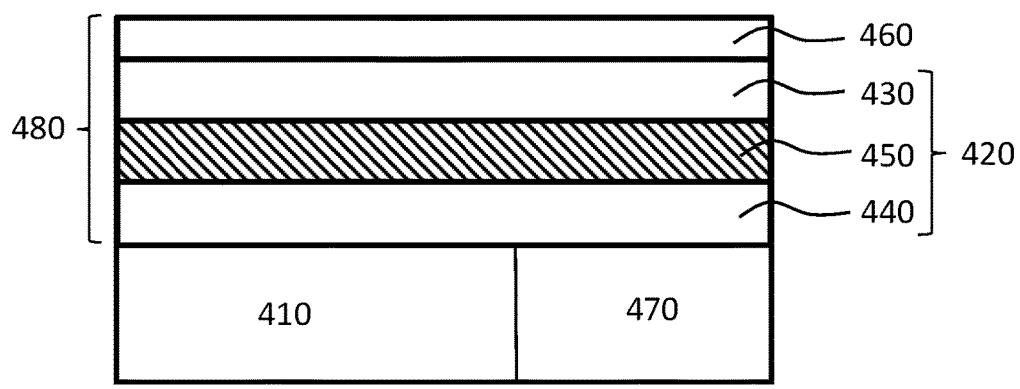
FIG. 4 depicts a secured device according to a second embodiment.

As depicted in FIG. 4, a secured device 400 according to a second embodiment includes an internal component 410 in a casing 480. The casing 480 includes, in at least a portion thereof, a security layer 420. Security layer 420 includes a first reactive component 430, a second reactive component 440, and fracturable layer 450. The fracturable layer 450, in an initial state, separates the first reactive component 430 from the second reactive component 440. The fracturable layer 450 is configured to degrade, rupture, break, shatter, fracture, etc. in response to a stimulus such as might be associated with a tampering event. After the stimulus is encountered, the fracturable layer 450 no longer separates the first reactive component 430 from the second reactive component 440 and these components can contact and react with each other. A protective coating 460 may be disposed on the security layer 420 or may be absent. In some embodiments, protective coating 460 may be integrated with the security layer 420.

The secured device 400 may be, without limitation, a circuit board, a packaged integrated circuit, a microchip, a microprocessor, an electronic card device, a cartridge device, a cryptographic module, or combinations of these elements.

The internal component 410 may be, without limitation, a circuit board, an integrated circuit, a packaged integrated circuit, a microchip, a microprocessor, an electronic card device, a cartridge device, a cryptographic module, or combinations of these elements. Additionally, while a single internal component 410 is shown in the secured device 400 depicted in FIG. 4, a plurality of internal components 410 may be provided in the secured device 400. Internal component 410 may also include a power source such as a battery.

Casing 480 is depicted in FIG. 4 as disposed on only one side of internal component 410; however, the representation in FIG. 4 is schematic and casing 480 in some embodiments may be disposed on one or more sides of internal component 410. For example, casing 480 may fully surround or encapsulate internal component 410 or may only partially surround or encircle internal component 410. In addition, various portions of the internal component 410 might be left uncovered as needed for mounting or connecting the secured device 400 within a computing system. For example, various terminals, leads, contacts, or wires might be left exposed by, or allowed to protrude from, casing 480.

Security layer 420 includes a first reactive component 430, a second reactive component 440, and fracturable layer 450. The fracturable layer 450, in an initial state, separates the first reactive component 430 from the second reactive component 440. As noted, the fracturable layer 450 is configured to degrade, rupture, break, shatter, fracture, etc. in response to a stimulus such as might be associated with a tampering event. After such a stimulus is applied, the fracturable layer 450 no longer separates the first reactive component 430 from the second reactive component 440 and these components may react with each other.

Security layer 420 is a portion of casing 480; however, the security layer 420 need not be provided in all portions of casing 480. That is, in some embodiments, the security layer 420 might be present in only in particular portions of casing 480, for example, only those portions of casing 480 considered vulnerable or susceptible to tampering actions might incorporate the security layer 420. For example, if the secured device 400 is intended to be mounted within a computer system such that only one outer surface of secured device 400 would be left exposed to tampering threats, the security layer 420 might be provided only on the side that will be left exposed. Similarly, it is not required for the security layer 420 to be provided as continuous or fully integrated element within casing 480. For example, the security layer 420 might be absent at certain edges of the casing 480 or other portions of casing 480.

Other types of layers may be included in or on security layer 420 for various purposes, such as structural stability, chemical resistance, or tampering prevention or the like. Such additional layers may be laminated (or otherwise mounted) on security layer 420 or physically spaced from security layer 420 within casing 480. For example, metal layers, radiation blocking layers, or the like might be included in or with security layer 420. Similarly, metal meshes may be embedded in or laminated on internal layers of security layer 420 for various purposes. And, as discussed further below in conjunction with FIG. 5, casing 480 may also incorporate other components such as reactive layers, ignition layers, and the like.

Heat sensor 470 is used to monitor the temperature of casing 480. Heat sensor 470 may be, for example, a thermocouple, thermistor, a silicon bandgap temperature sensor or the like. While only one heat sensor 470 is depicted in FIG. 4, a plurality of heat sensors 470 may be incorporated into secured device 400. Heat sensor 470 may be optional in some embodiments. When present, heat sensor 470 functions in a manner similar to that described above in conjunction with heat sensor 140. That is, heat sensor 470 is used to detect a temperature rise (or change) associated with a tampering event and to trigger a security response, such as shutdown of internal component 410.

The first reactive component 430 and second reactive component 440 undergo an exothermic reaction when mixed or otherwise placed in contact with each other. The fracturable layer 450 is designed to rupture in response to tampering events so as to allow the first reactive component 430 and second reactive component 440 to contact each other and then react to generate heat to cause the temperature in the casing 480 to increase (at least in some area local to the tampering site). That is, when casing 480 is physically probed, drilled, or otherwise subjected to physical forces, the fracturable layer 450 in some portion of security layer 420 fractures in response. The heat generated by the mixing of the reactive components will then increase the temperature of casing 480 (or some portion thereof). In some embodiments, the heat sensor 470 is used to detect the associated temperature increase in the casing 480 (or some portion thereof) and trigger a security response. In other embodiments, the reaction between the reactive components may be sufficiently exothermic to directly disable or destroy the internal component 410 such that a heat sensor 470 is not required.

In general, the first reactive component 430 and the second reactive component 440 can be any two materials which react exothermically with each other. In a particular example, the first reactive component 430 comprises iron (Fe) and the second reactive component 440 comprises hydrogen peroxide ($H_2O_2$). Alternatively, the first reactive component 430 may be hydrogen peroxide and the second reactive component 440 may be iron powder mixed with ferric nitrate. In another example, the first reactive component 430 comprises potassium permanganate ($KMnO_4$) and the second reactive component 440 comprises ethylene glycol (ethane-1,2-diol). In some embodiments, the second reactive component 440 may comprise a thermite-type component suspended in ethylene glycol or the like. In this context, a thermite-type component is a composition including a metal powder and a metal oxide which undergoes an exothermic redox (reduction-oxidation) reaction when ignited. In some embodiments, the thermite-type component may include additional oxidizer components such as nitrates or peroxides.

The first reactive component 430 and the second reactive component 440 may be liquids at standard temperatures and pressures. These reactive components may be provided in different portions of casing 480 in distinct, initially fluid-tight compartments, bladders, holds, voids, sinks, or the like. The fracturable layer 450 may form an interface between the different portions of the casing 480 respectively including the first reactive component 430 and the second reactive component 440.

The fracturable layer 450 separating the first reactive component 430 and the second reactive component 440 may be any material or structure that will fracture, rupture, or otherwise degrade in response to a stimulus likely to be associated with a tampering event. For example, the fracturable layer 450 may be a glass with high internal tensile stress that will shatter in response to forces associated with physical tampering events, such as, for example, the drilling of casing 480. In other embodiments, the fracturable layer 450 may respond to thermal stimulus events or electromagnetic stimulus events likely to be associated with certain types of tampering events.

A protective coating 460 may be provided as a portion of casing 480. For example, protective coating 460 may be a metallic material or resin material protecting internal portions of casing 480 and/or secured device 400 from abrasion, light, or external stimuli not particularly likely to be associated with tampering events. For example, protective coating 460 may be adapted to prevent fracturable layer 450 from responding to physical forces attendant to normal or expected operating conditions of secured device 400.

Figure 5:
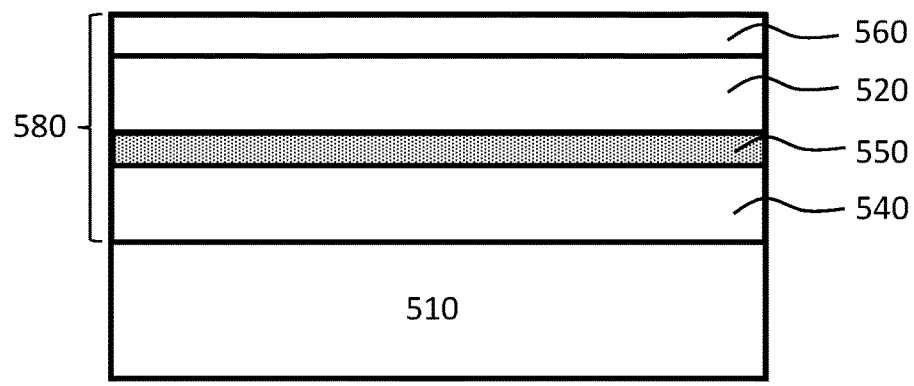
FIG. 5 depicts a secured device according to a third embodiment.

FIG. 5 depicts a secured device 500 according to a third embodiment. The secured device 500 includes an internal component 510 in a casing 580. The casing 580 includes, in at least a portion thereof, a security layer 520. A protective coating 560 similar to protective coating 460 may be provided as a portion of casing 580

Security layer 520 generates heat in response to a tampering event. Security layer 520 may be, for example, similar to a security layer 124 described in conjunction with FIG. 1 or a security layer 420 described in conjunction with FIG. 4.

The security layer 520 is disposed on an ignition layer 550 that is configured to decompose in response to the heat generated by the security layer 520. The ignition layer 550 may be, for example, comprised of magnesium or the like. The ignition layer 550 is not required to be a solid layer and may be comprised of particles, powders, ribbons, meshes, or the like.

The ignition layer 550 is disposed on a destructive layer 540 that operates to physically destroy, disable, or disfigure the internal component 510 after being ignited by the ignition layer 550. The destructive layer 540 may be, for example, a thermite layer or a thermite-type layer. The heat and/or flames associated with activation of the destructive layer 540 functions to destroy, disable, or disfigure the internal component 510. The destructive layer 540 may be provided as a solid or a liquid layer. Additional layers or components of casing 580 may be interposed between destructive layer 540 and the internal component 510.

Casing 580 is depicted in FIG. 5 as disposed on only one side of internal component 510; however, the representation in FIG. 5 is schematic and casing 580 in some embodiments may be disposed on one or more sides of internal component 510.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present invention, other and further embodiments of the invention may be devised without departing from the basic scope thereof, and the scope thereof is determined by the claims that follow.

What is claimed is:

1. A method of providing a tamper resistant apparatus, comprising:
   surrounding an internal component with a matrix material including a microcapsule, wherein
   the microcapsule has a first compartment, a second compartment, and an isolating structure separating the first and second compartments, the isolating structure being rupturable in response to a stimulus, the first compartment containing a first component, and the second compartment containing a second component that reacts with the first component to produce heat.

2. The method of claim 1, wherein the microcapsule is a shell-in-shell microcapsule and the isolating structure is an inner shell surrounding the first compartment.

3. The method of claim 1, wherein the first component is a metal and the second component is an oxidizer.

4. The method of claim 1, further comprising:
   placing a heat sensor adjacent to the matrix material, the heat sensor being configured to sense a change in temperature in the matrix material caused by rupture of the isolating structure in response to the stimulus and subsequent reaction of the first and second components after the rupture.

5. A method of providing a secured device, comprising:
   surrounding an electronic component with a casing having a security layer including:
      a matrix material, and
      a microcapsule that is in the matrix material, the microcapsule having a first compartment, a second compartment, and an isolating structure separating the first and second compartments and adapted to rupture in response to a stimulus, wherein
   the first compartment contains a first component, and
   the second compartment contains a second component that reacts with the first component to produce heat.

6. The method of claim 5, further comprising:
   disposing a heat sensor within the casing, the heat sensor being configured to sense a temperature within the casing and output a signal indicating the temperature.

7. The method of claim 5, further comprising:
   disposing a heat sensor within the casing, the heat sensor being configured to sense a temperature within the casing and to trigger a security response when the temperature changes.

8. The method of claim 7, wherein the security response includes shutdown of the electronic component.

9. The method of claim 7, wherein the security response includes transmission of an alarm signal.

10. The method of claim 5, wherein the microcapsule is a shell-in-shell microcapsule and the isolating structure is an inner shell adapted to rupture when a compressive force is applied via the matrix material.

11. The method of claim 5, wherein the isolating structure is a membrane.

12. The method of claim 5, wherein the casing further includes a thermally conductive layer contacting the security layer.

13. The method of claim 5, wherein the security layer further comprises a metal mesh embedded in the matrix material.

14. The method of claim 5, wherein the first component is a metal and the second component is an oxidizer.

15. A method of providing a secured device, comprising:
   surrounding an electronic component with a casing including a security layer having:
      a first reactive component in a first portion,
      a second reactive component in a second portion, and
      a fracturable layer separating the first portion from the second portion, the fracturable layer adapted to fracture in response to a stimulus, wherein
   the first reactive component reacts with the second reactive component to produce heat.

16. The method of claim 15, further comprising:
   disposing a magnesium layer between the security layer and the electronic component; and
   disposing a thermite layer between the magnesium layer and the electronic component.

17. The method of claim 15, further comprising:
   disposing a heat sensor within the casing.

18. The method of claim 15, wherein the first reactive component comprises iron and the second reactive component comprises hydrogen peroxide.

19. The method of claim 15, wherein the first reactive component comprises potassium permanganate and the second reactive component comprises ethylene glycol.

20. The method of claim 15, wherein the fracturable layer is glass.

* * * * *